United States Patent [19]

Pertriaux

[11] 4,047,741
[45] Sept. 13, 1977

[54] COMPOSITE REINFORCED PIPE UNION

[75] Inventor: Jean-Pierre Felix Pertriaux, Paris, France

[73] Assignee: Pont-A-Mousson S.A., Nancy, France

[21] Appl. No.: 636,870

[22] Filed: Dec. 2, 1975

Related U.S. Application Data

[63] Continuation of Ser. No. 463,024, April 22, 1974, abandoned.

[30] Foreign Application Priority Data

June 22, 1973 France .................................. 73.23019

[51] Int. Cl.² ............................................... F16L 9/14
[52] U.S. Cl. ...................................... 285/55; 285/156; 285/DIG. 16
[58] Field of Search ......... 285/423, 21, 156, DIG. 16, 285/373, 55, 419, 150, 155, DIG. 20; 138/141, 143, 153, 170, 99, 172, 161, 166; 156/173, 187, 191, 195, 218

[56] References Cited

U.S. PATENT DOCUMENTS

| 2,789,934 | 4/1957 | Busbauh | 285/DIG. 20 |
| 3,148,896 | 9/1964 | Chu | 285/55 |
| 3,200,023 | 8/1965 | Cilker | 285/55 X |
| 3,338,598 | 8/1967 | Kurtz | 285/55 |
| 3,387,864 | 6/1968 | Walters | 285/373 X |
| 3,561,795 | 2/1971 | Becha | 285/55 |
| 3,633,943 | 1/1972 | Ramm et al. | 285/DIG. 16 |
| 3,771,820 | 11/1973 | Hoss et al. | 285/373 |

FOREIGN PATENT DOCUMENTS

| 732,948 | 4/1966 | Canada | 285/373 |
| 889,203 | 12/1971 | Canada | 285/373 |

Primary Examiner—Dave W. Arola
Attorney, Agent, or Firm—Sughrue, Rothwell, Mion, Zinn and Macpeak

[57] ABSTRACT

The composite pipe union comprises a body of glass fibres embedded in a thermosetting plastics material. The body has at least two tubular end portions having a generally cylindrical shape. A metal case formed of two assembled half-shells surrounds the body and the latter adheres to the case throughout the provision of a film of a material ensuring said adhesion and interposed between the body and the case.

11 Claims, 6 Drawing Figures

U.S. Patent  Sept. 13, 1977  Sheet 1 of 2  4,047,741
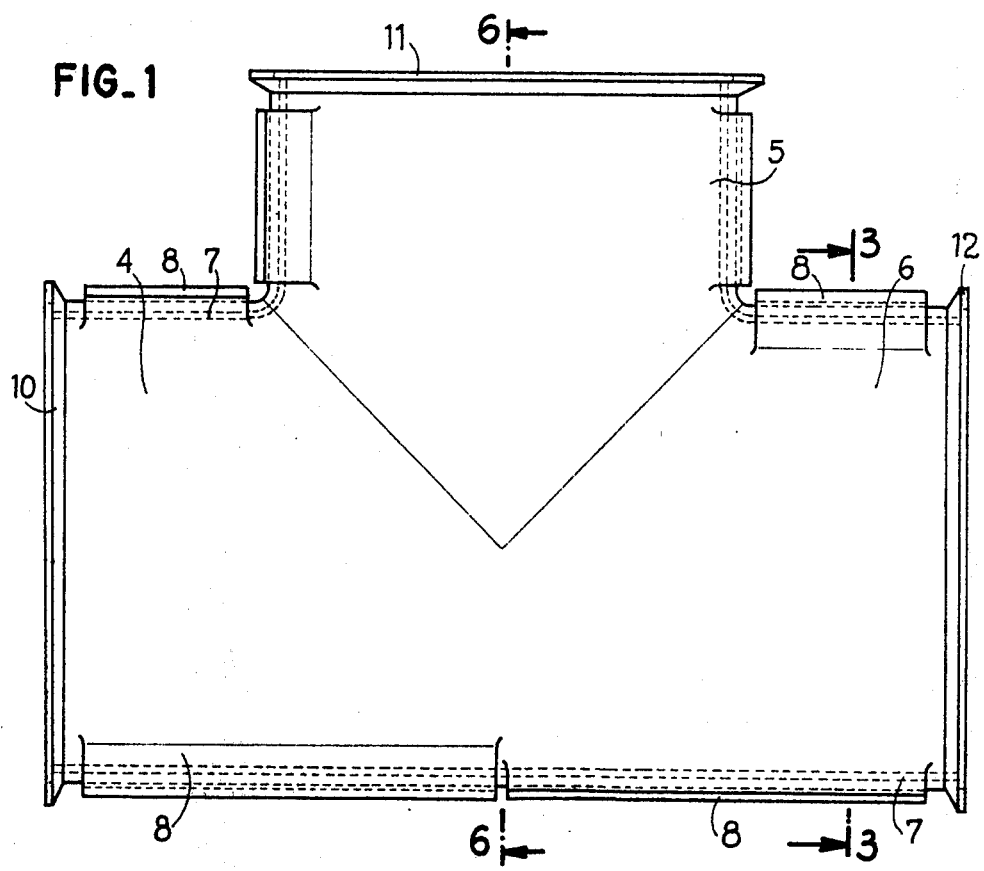
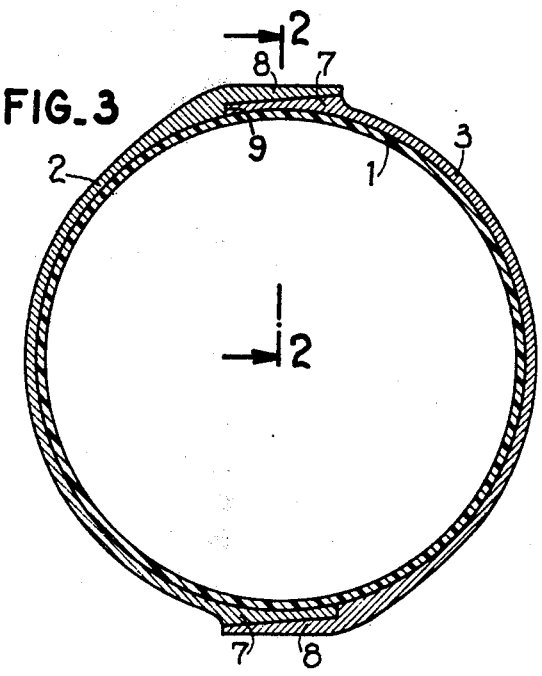
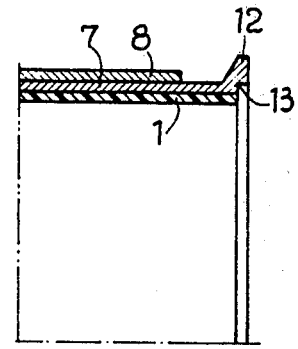

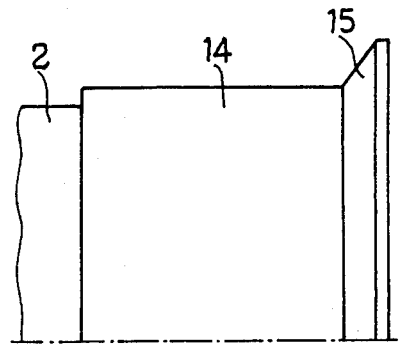
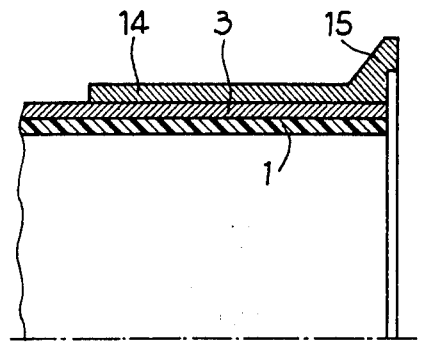
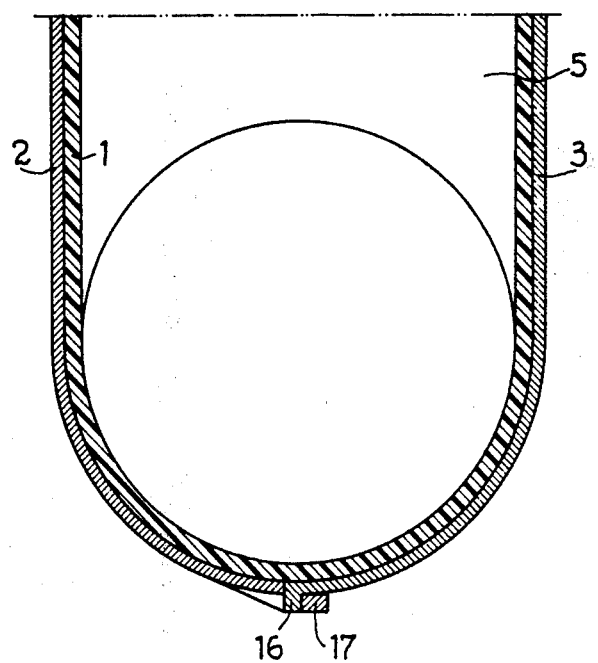

COMPOSITE REINFORCED PIPE UNION

This is a continuation, of application Ser. No. 463,024, filed Apr. 22, 1974, and now abandoned.

The present invention relates to reinforced composite unions for pipes. It more particularly concerns unions of complex form for example T-unions of the type comprising a body of glass fibres embedded in a thermosetting plastics material having at least two tubular generally cylindrical end portions. In respect of unions of this type, there may be employed glass fibres in the form of a continuous filament or roving. While it is easy to wind roving on a cylindrical tubular element, it is extremely difficult to wind it on a union of complex shape. This is why, in respect of the latter case and in order to improve the production rate, it is preferred to cut from a fabric or voile of glass the desired reinforcement, although, in this form, the glass fibres have inferior mechanical properties. Therefore, it is necessary, on one hand, to employ a glass fabric or voile having a high glass content (of the order of 50 to 60%) and, on the other hand, to impart to the reinforcement a considerable thickening in the weakest regions of the union, this thickening reaching as much as 50% of the body thickness. Moreover, the strength of such unions has a high dispersion and is consequently difficult to guarantee. Another drawback of known unions of the aforementioned type resides in the fact that the glass fibres are frequently flush with the outer surface of the union and it is necessary to provide an additional layer having a higher content of plastics material so as to protect the union from corrosion.

An object of the present invention is to avoid the aforementioned drawbacks and to provide a union of the aforementioned type which comprises also a metal case formed of two assembled half-shells to which case said body adheres throughout its outer surface, a film of a material ensuring said adhesion being interposed between the body and the case.

Further features and advantages of the invention will be apparent from the ensuing description with reference to the accompanying drawings.

In the drawings:

FIG. 1 is an elevational view of a T-union according to the invention;

FIG. 2 is a half axial sectional view of a tubular end portion of this union taken on line 2—2 of FIG. 3;

FIG. 3 is a cross-sectional view taken on line 3—3 of FIG. 1 of this tubular end portion;

FIG. 4 is a half side elevational view of one tubular end portion of a modification of the union according to the invention;

FIG. 5 is a half axial sectional view of the end portion shown in FIG. 4, and

FIG. 6 is a partial sectional view taken on line 6—6 of FIG. 1 of a second embodiment of a union according to the invention.

The T-union shown in FIGS. 1 to 3 comprises a body 1 of thermosetting plastics material reinforced with a fabric or voile of glass fibres, the content of glass being between 10 and 30%, surrounded with two interconnected identical metal half-shells 2 and 3, for example of aluminium or cast iron, to which the body 1 adheres throughout its outer surface. Indeed, this union is obtained by enclosing a mandrel having the shape of a T, composed of two perpendicular parts and on which had been disposed the glass fibre, between the two half-shells and, after having assembled the latter in the manner explained hereinafter, injecting by way of orifices (not shown) provided in the half-shells the plastics material in the space partially occupied by the glass fibres so that it coats the fibres. The two parts of the mandrel are then withdrawn. The two half-shells 2 and 3 thus serve as a disposable mould. They are coated internally and externally with a layer of epoxyde resin which ensures on the outside a protection against corrosion and on the inside a good adhesion of the plastics material.

The union has three cylindrical tubular end pipe portions 4, 5 and 6 having a circular section the portion 5 being perpendicular to the other two and its axis being equally distant from the end faces of the portions 4 and 6. As can be seen in FIG. 3, each half-shell 2 and 3 is on the whole of semi-cylindrical shape and terminates along each tubular portion 4, 5 and 6, on one hand, in a thicker portion 7 which is cylindrical internally and planar externally and, on the other hand, in a portion 8 which is also thicker and internally planar and has an internal shoulder 9. When the two half-shells 2 and 3 are assembled, each portion 8 of one half-shell 2 or 3 covers externally a portion 7 of the other half-shell 3 or 2, the end of this portion 7 being in abutment with the corresponding shoulder 9. The assembly of the two half-shells 2 and 3 is achieved by adhesion, for example by means of an epoxyde adhesive, of the planar surfaces of the portions 7 and 8. Each tubular portion 4, 5 and 6 of the union has at its free end a frustonconical V-section flange respectively 10, 11 and 12 formed from two semi-flanges which are integral with the half-shells 2 and 3 and defining internally a shoulder 13 at 90° allowing the engagement of an annular sealing element. These flanges 10, 11 and 12 are adapted to bear against identical flanges on the pipes to be interconnected, the fixing together being ensured in the known manner by means of clamping rings.

The modification shown in FIGS. 4 and 5 differs from the embodiment just described in that the tubular portions of the half-shells 2 and 3 are exactly cylindrical, each one of these portions being capped by a cylindrical sleeve 14 having a V-section flange 15 of the same shape as the flange 12 of the embodiment shown in FIGS, 1–3, this sleeve 14 maintaining the two half-shells applied against each other.

Further, in service, the region of the union located in the extension of the median tubular portion 5 is subjected to particularly high forces on the part of the fluid conveyed in the union, in particular in the case of hammering. This is why it is advantageous to provide in this region an additional assembly of two half-shells, for example portions intended for the adhesion of the half-shells similar to the portions 7 and 8 shown in FIGS. 1 to 3, or, as shown in FIG. 6, outer hooking portions 16 and 17 which are capable of hooking onto each other upon a relative longitudinal sliding of the two half-shells.

Embodiments of unions other than those shown in the drawings may be imagined without departing from the scope of the invention and in particular elbows. It is also possible within the scope of the invention to modify the manner of fixing the half-shells to each othe and/or the shape or form of the flanges.

Having now described my invention what I claim as new and desire to secure by Letters Patent is:

1. A reinforced composite pipe union comprising in permanent combination : a body defined by a body wall of substantially constant thickness and comprising web means of glass fibres embedded in a thermosetting plastics material in the thermoset condition, said body comprising at least two tubular end pipe portions for respectively receiving ends of at least two pipes to be united by the union, the end pipe portions meeting at an angle in an intermediate part of the union and each having a continuously generally substantially cylindrical outer and inner shape, two assembled metal half-shells constituting a case containing said body with which case said body is co-extensive throughout the outer surface of said body, a film of an adhesive material interposed between said body and said case for adhering said body to said case, and means at ends of said end pipe portions for the fixing of said ends of said pipes to the union, said body being in one inseparable piece and defining an inner surface which is continuous and impervious to the fluid to be conveyed by said union and said pipes so as to be capable of conveying said fluid.

2. A union as claimed in claim 1, wherein said case is provided, in the vicinity of each one of said tubular portions of said body, with outer flanges formed by two half-flanges respectively integral with the half-shells.

3. A union as claimed in claim 1, wherein the two half-shells are assembled by adhesion.

4. A union as claimed in claim 1, wherein the two half-shells are assembled by means of sleeves having a generally cylindrical shape which cap semi-cylindrical portions of said half-shells.

5. A union as claimed in claim 4, wherein said sleeves are each provided with an integral outer end flange.

6. A union as claimed in claim 2, wherein the flanges have a frustoconical diametral section.

7. A union as claimed in claim 1, the union being a T-union.

8. A union as claimed in claim 7, wherein the half-shells are provided with additional hooking assembly means substantially in the extension of a branch of the T which constitutes the median branch.

9. A union as claimed in claim 1, wherein said adhesive material ensuring the adhesion is an epoxy resin.

10. A reinforced composite pipe union comprising in permanent combination :

a body defined by a body wall of substantially constant thickness and comprising fabric means of glass fibre embedded in a thermosetting plastics material in the thermoset condition, said body comprising three tubular end pipe portions for respectively receiving ends of three pipes to be united by the union, the end pipe portions meeting in an intermediate part of the union and each having a continuous generally substantially cylindrical outer and inner shape, two assembled metal half-shells constituting a case containing said body with which case said body is co-extensive throughout the outer surface of said body, a film of an adhesive material interposed between said body and said case for adhering said body to said case, and means at ends of said end pipe portions for the fixing of said ends of said pipes to the union, said body being in one inseparable piece and defining an inner surface which is continuous and impervious to the fluid to be conveyed by said union and said pipes so as to be capable of conveying said fluid.

11. A reinforced composite pipe union of substantially conventional shape comprising in permanent combination : a body defined by a body wall of substantially constant thickness and comprising voile means of glass fibre embedded in a thermosetting plastics material in the thermoset condition, said body comprising three tubular end pipe portions for respectively receiving ends of three pipes to be united by the union, the end pipe portions meeting in an intermediate part of the union and each having a continuous generally substantially cylindrical outer and inner shape, two assembled metal half-shells of substantially constant thickness constituting a case containing said body with which case said body is co-extensive throughout the outer surface of said body, a film of an adhesive material interposed between said body and said case for adhering said body to said case; and means at ends of said end pipe portions for the fixing of said ends of said pipes to the union, said body being in one inseparable piece and defining an inner surface which is continuous and impervious to the fluid to be conveyed by said union and said pipes so as to be capable of conveying said fluid, the internal cross-sectional shape of said pipe portions being substantially constant from adjacent their ends to where they meet and adapted to correspond substantially to the internal cross-sectional shape and size of said pipes.

* * * * *